United States Patent [19]

Ausprung

[11] Patent Number: 4,773,804

[45] Date of Patent: Sep. 27, 1988

[54] SELF-SECURING LOCK BOLT

[75] Inventor: Erich Ausprung, Geislingen, Fed. Rep. of Germany

[73] Assignee: Saxonia-Franke GmbH & Co., Göppingen, Fed. Rep. of Germany

[21] Appl. No.: 924,856

[22] Filed: Oct. 29, 1986

Related U.S. Application Data

[63] Continuation of Ser. No. 688,013, Dec. 31, 1984, abandoned.

[30] Foreign Application Priority Data

Dec. 29, 1983 [DE] Fed. Rep. of Germany ....... 3347503

[51] Int. Cl.⁴ ............................................. F16B 19/00
[52] U.S. Cl. .................................... 411/61; 411/479; 411/508; 411/501; 411/520
[58] Field of Search .................... 411/47, 61, 67, 477, 411/478, 479, 508, 509, 510, 913, 520, 521, 501

[56] References Cited

U.S. PATENT DOCUMENTS

| 2,353,795 | 7/1944 | Tinnerman | 411/520 |
| 2,408,340 | 9/1946 | Poupitch | 411/520 |
| 2,451,591 | 10/1948 | Tinnerman et al. | 411/508 |
| 2,509,192 | 5/1950 | Poupitch | 411/508 |
| 2,550,060 | 4/1951 | Gisondi | 411/448 |
| 2,560,530 | 7/1951 | Burdick | 411/508 |
| 2,560,961 | 7/1951 | Knohl | 411/913 X |
| 2,589,028 | 3/1952 | Poupitch | 411/61 X |
| 2,620,537 | 12/1952 | Gobin-Daude | 411/61 X |
| 2,687,666 | 8/1954 | Chalfont et al. | 411/520 |
| 2,707,013 | 4/1955 | Flora et al. | 411/913 X |
| 2,713,284 | 7/1955 | Bedford, Jr. | 411/508 |
| 2,748,645 | 6/1956 | Peckham et al. | 411/61 X |
| 2,779,229 | 1/1957 | Jahn | 411/449 |
| 3,217,584 | 11/1965 | Amesbury | 411/913 X |
| 4,517,711 | 5/1985 | Tanaka | 411/61 X |

FOREIGN PATENT DOCUMENTS

| 2541105 | 3/1977 | Fed. Rep. of Germany | 411/509 |
| 2648496 | 4/1978 | Fed. Rep. of Germany | 411/520 |
| 3000759 | 7/1980 | Fed. Rep. of Germany | . |
| 51152727 | 7/1978 | Japan | 411/521 |

*Primary Examiner*—Richard E. Moore
*Assistant Examiner*—Rodney M. Lindsey
*Attorney, Agent, or Firm*—Peter K. Kontler

[57] ABSTRACT

A lock bolt is disclosed for introduction into a through hole in a structural component. The lock bolt generally is a one piece tubular bolt member having a shank with two sections joined at a first end by a bridge and with a resilient locking member integral with a first of the two sections at a second end and extending within the bolt shank and then radially outward of the bolt shank at the second of the two sections to define an end portion to in conjunction with an abutment on the bolt secure the bolt in the through hole.

8 Claims, 8 Drawing Sheets

SELF-SECURING LOCK BOLT

This application is a continuation of application Ser. No. 688,013, filed Dec. 31, 1984 now abandoned.

The invention relates to a self-securing lock bolt of the kind introduced in through-holes in structural components from one side thereof up to an abutment.

Self-securing lock bolts of the aforesaid kind have been known. For example, DE-OS specification No. 26 48 496 teaches a safety bolt adapted to be introduced into a through-hole in a structural component until an abutment engages; the prior bolt is adapted to be locked in that position whereafter it cannot be withdrawn from the through-hole any more. The prior safety bolt substantially comprises a circular cylinder or tubular element. After this element has been introduced into a through-hole in a structural component, it is locked in place by further introducing a resilient strip member from one side into the opening of the element in a manner such that its leading edge emerges on the opposite side of the opening through a slot which angularly extends from that opening to the outside, whereafter the leading edge will engage one side of the component in hook fashion. The other end of the resilient strip element is manipulated to engage the other side of the component.

One disadvantage of a safety bolt of this kind is that its fabrication and handling are relatively cumbersome and expensive because it consists of two different parts. Also, the tubular element is solid initially and has to be provided with an opening or bore therethrough. In use, the tubular element must first be introduced into the through-hole of a component. Thereafter, the resilient strip must be introduced into the opening of the tubular element in a manner such that its free end emerges from the slot which extends outwardly at an angle. This process is tedious and requires a relatively long period of time.

DE-OS specification No. 30 00 759 discloses a bolt member of which the shank is made by a rolling operation. One disadvantage of this bolt is that the rolling operation limits the thickness of the shank; as a result, the load receiving capacity of such bolts is limited as well. Also, rolling operations are unsuited to provide shanks having relatively small diameters. In particular, it is not possible to realize diameters smaller than about six millimeters. Moreover, the rolling treatment requires relatively expensive tooling; for this reason rolled-shank bolts are relatively expensive too.

It is the object of the invention to provide a self-securing bolt element which is much simpler to fabricate than the above prior safety bolt and which can also have a shaft with a very small diameter.

An essential advantage of the inventive lock bolt is that it may be provided with small shank diameters. In particular, and advantageously, it is possible by the invention to realize shank diameters smaller than 6 mm.

Also, and advantageously, the inventive lock bolt is of a nature that it may be fabricated by simple process measures and with relatively heavy material gauges from a one-piece blank.

Further, the tooling required for making the inventive lock bolt is relatively simple and inexpensive; as a result, the inventive lock bolt itself is relatively inexpensive as well.

An essential advantage of the inventive lock bolt over the element known by DE-OS specification No. 26 48 496 is that it is a one-piece component. Advantageously, the use of the inventive lock bolt produces substantial savings in time because it is not necessary any more to introduce a second component after the bolt itself has been placed in position in the through-hole of a structural component.

Fabrication of the inventive lock bolt is extremely simple and requires very few steps only. In particular, the inventive lock bolt may be produced by a punching operation and a bending operation only.

In one embodiment of the invention, the inventive lockbolt consists of a high-strength spring steel having a small surface area. It is shaped by a punching and a bending operation to produce the final form and shape of the bolt. In contrast to the known safety bolt, the inventive lock bolt has a much lower weight as its surface area is small and the element itself is not solid. Besides, a substantial amount of material can be saved in comparison with the known bolts.

Another essential advantage is that the inventive self-securing lock bolt exhibits higher shear strengths than the known solid bolts.

In order to facilitate an understanding of the invention, its subject matter and exemplary embodiments thereof shall now be explained in detail under reference to the attached Figures.

Figure 1:
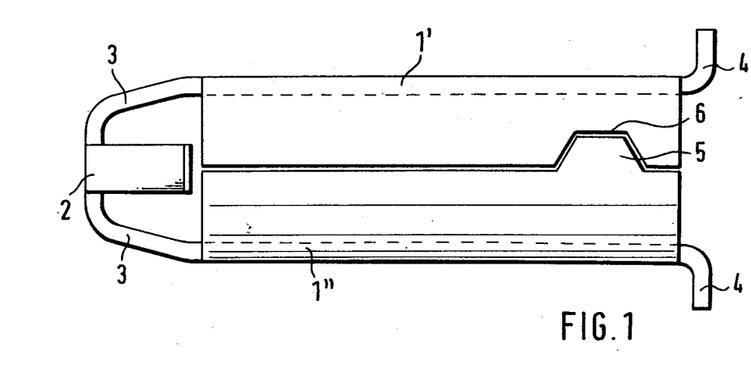
FIGS. 1 to 4 show a first embodiment of the inventive lock bolt.

Turning now to FIG. 1, there is shown an inventive lock bolt essentially comprising a shank 1, locking members 2 connected to one side of shank 1 by a bridge member 3, and abutment means 4 at the other side of the shank and extending radially outwardly from the periphery of shank 1.

Figure 2:
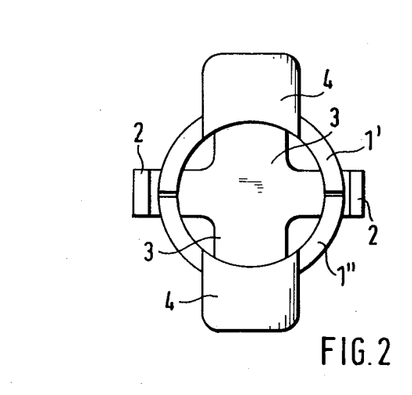
Figure 3:
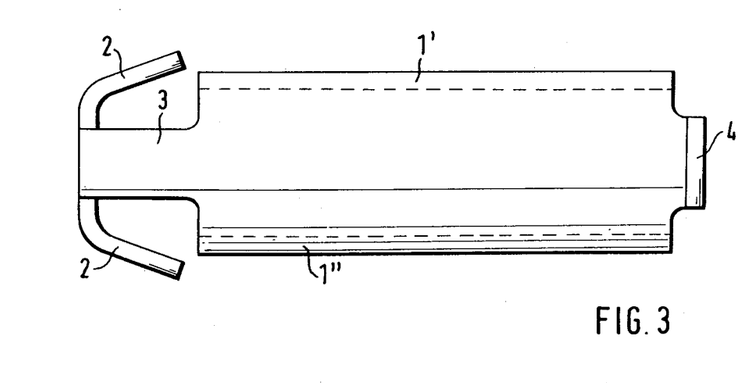

FIG. 2 shows a view from the other side of lock bolt depicted in FIG. 1. As is shown, shank 1 comprises two preferably semi-cylindrical halves 1' and 1" which are interconnected through bridge 3 at one side of the shank. Bridge 3 is in the form of a strip element bent into a V-shape, approximately, which projects from one side of shank 1. Locking members 2 extend at right angles to the longitudinal axis of bridge 3. As shown particularly in FIG. 3, locking members 2 each have the form of a rectangular tab bent to extend at an angle towards one side of shank 1, with the distal ends of locking members 2 extending radially beyond the periphery of shank 1. The one side of shank 1 and the distal ends of locking members 2 are spaced a distance such that the ends of locking members 2 may be pressed inwards resiliently to not extend beyond the periphery of shank 1 any more.

For setting the inventive self-securing lock bolt in the through-hole of a structural component (not shown) or in the axially aligned through-holes in a plurality of structural components, the lockbolt is inserted—locking element first—into the through-hole or into the through-hole of the outermost component, respectively. The outwardly inclined surfaces of the locking element 2 will engage the edge of the through-hole opening. Pressure exerted on the lock bolt in the longitudinal direction of shank 1 will cause locking members 2 to resiliently deflect radially inwards, so that their ends will enter the through-hole, followed by the shank of lock bolt 1. Once the lock bolt has been introduced in the through-hole(s) far enough for abutments 4 to engage one side of the outermost adjacent structural component, the ends of locking members 2 will emerge from the through-hole on the other side of the structural component(s) and will resiliently return to the position shown in FIG. 3, in which the ends of locking members 2 extend radially beyond the periphery of shank 1.

Figure 4:
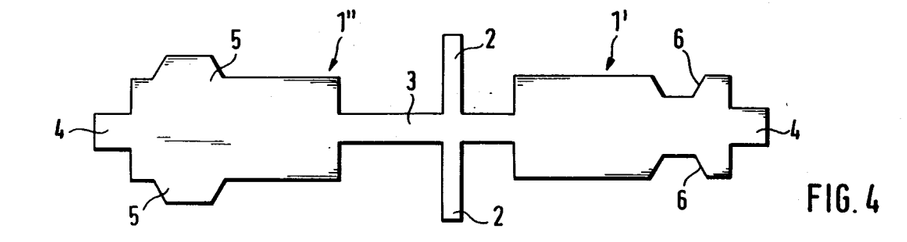

To make the inventive lock bolt, a blank shaped as shown in FIG. 4 is punched from spring strip steel. In a subsequent bending steps, this blank is treated to result in the finished one-piece lock bolt. In this bending steps the two halves of shank 1 are bent to the shape of one half of a circular cylinder, abutments 4 are bent outwards, bridge 3 is bent to its V-shape, and locking members 2 are bent outwards, as described.

As is evident particularly in FIG. 1, the adjacent edges of the circularly cylindrical shank halves 1', 1" may have locking tabs each extending in a circumferential direction beyond an edge of a shank half. In the corresponding area of the opposite shank half, recesses 6 are provided and shaped so as to completely receive locking tabs 5 when shank halves 1', 1" are joined to form a complete circular cylinder. Preferably, these locking tabs are trapezoidal in shape so that they may readily enter the mating recesses 6. The object of these locking tabs 5 and their mating recesses 6 is to prevent axial relative movement of shank halves 1', 1" as may occur in case the two shank halves are loaded unequally when the lock bolt is introduced in a bore or the like. Also, when the two shank sections are joined to form the final shank, locking tabs 5 and recesses 6 cooperate to mutually align the shank sections.

Figure 5:
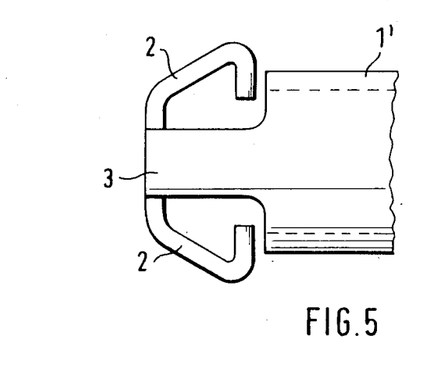
FIG. 5 shows a second embodiment of the inventive lock bolt.
Figure 6:
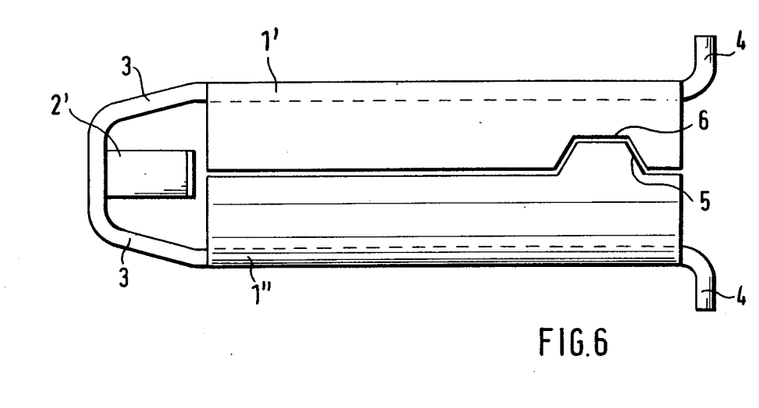
FIGS. 6 to 9 show a third embodiment of the inventive lock bolt.
Figure 7:
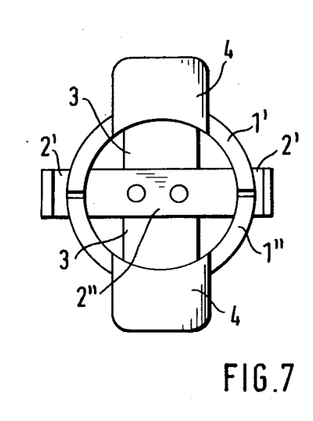

FIG. 5 shows an embodiment of the inventive lock bolt which corresponds substantially to the embodiment described under reference to FIGS. 1 to 4. However, in the embodiment of FIG. 5, the distal ends of locking members 2 are bent radially inwardly. This feature has the advantage that the lock bolt may be readily actuated so as to be removed from a through-hole after having been inserted in it.

This feature is obtained because return movement of the lock bolt will cause the through-hole edges to engage the rounded portions between the radially bent-off distal ends of locking members 2 and the outwardly inclined portions of locking members 2 as the latter are urged inwardly by hand. Furthermore, such locking members do not have sharp edges which might damage lacquered areas of the structural component in which the lock bolt is inserted.

Also, it is contemplated for the embodiments described above to provide in particular applications thereof more or fewer locking members and more or fewer abutment elements than stated hereinabove.

Figure 8:
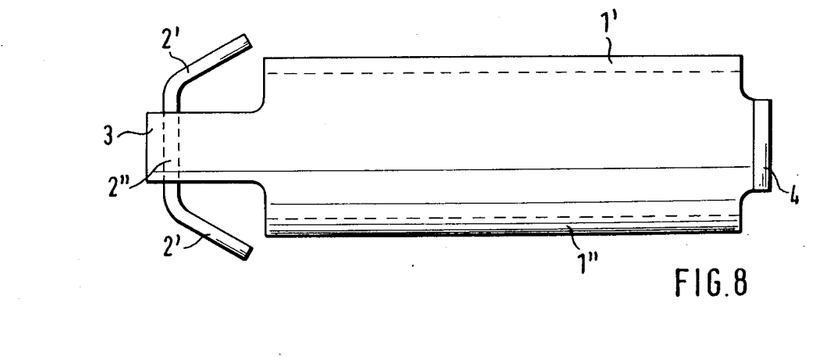
Figure 9:
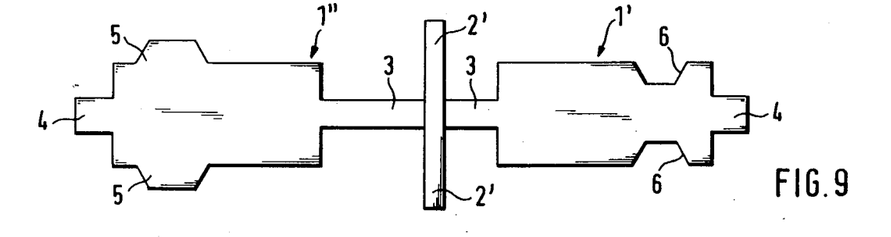
Figure 10:
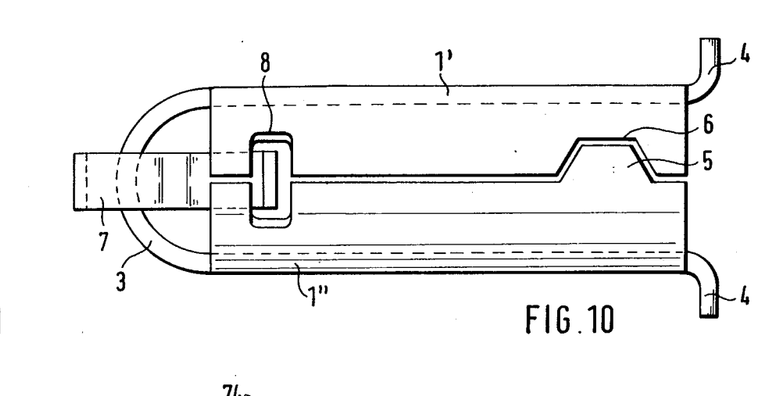
FIGS. 10 to 13 show a fourth embodiment of the inventive lock bolt.
Figure 11:
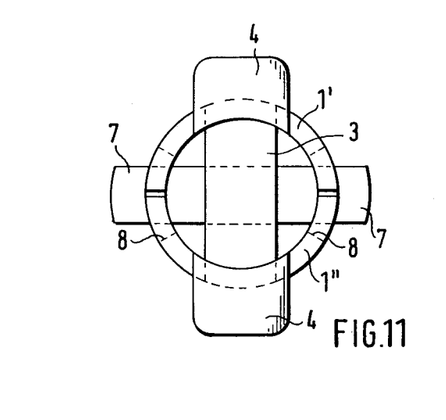
Figure 12:
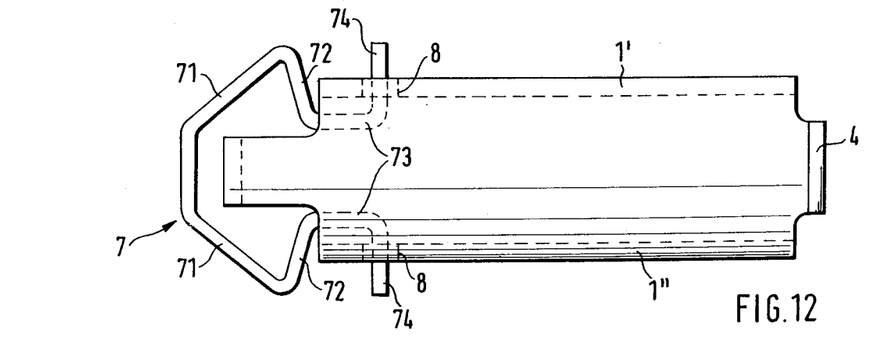

FIGS. 6 to 9 show another embodiment of the invention, which corresponds substantially to the embodiment described under reference to FIGS. 1 to 4. Accordingly, details in FIGS. 6 to 9 which have been described in connection with FIGS. 1 to 4 already have been assigned the same reference numerals. These embodiments differ, however, in that locking members 2' are not made of the same material as the remainder of the lock bolt. Rather, as is shown clearly in FIG. 8, locking members 2' comprise an elongated element secured to bridge 3 preferably by spot welding. As shown in FIG. 9, this member is secured to bridge 3 after the punching operation and prior to the bending operation. Also, in the embodiment shown in FIGS. 6 to 9, the distal ends of locking members 2' may have the configuration shown in FIG. 5.

An advantage of the embodiment involving separate locking members 2' secured to bridge 3 is that locking members 2' may consist of a thinner and highly resilient material, whereas the remainder of the inventive lock bolt may then consist of a relatively heavy-gauge material suited for receiving high loads. It would not be possible to make locking members 2' of that same heavy-gauge material because they would not be sufficiently resilient in that case.

FIGS. 10 to 13 show another embodiment of the invention in which a locking member 7 is inserted in openings 8 provided in opposite areas of the shank.

Locking member 7 is designed to preferably extend at right angles to the longitudinal axis of bridge 3. Locking member 7 comprises an elongated piece of spring steel which is bent to a V-shape to have side surfaces 71 outwardly inclined towards the one side of the shank to engage the edge of a through-hole when the lock bolt is introduced thereinto. The ends of side surfaces 71 merge with an area 72 in which the locking members are inwardly inclined towards a side surface of the shank so that portions 73 that join portions 72 at the ends thereof to extend about in parallel with the axial direction of the shank are spaced a distance smaller than the inner diameter of the shank. This way, additional portions 73 may be introduced from one end of the shank into the space the shank encloses.

End portions 74 extend outwardly and preferably in radial directions from portions 73 to extend through openings 8 after locking member 7 has been secured to shank 1', 1".

When a lock bolt of this kind is introduced into a through-hole, the edges of that through-hole engage the inclined side surfaces 71 of locking member 7, causing it to be compressed resiliently and the edges between portions 71 and portions 72 to be moved towards each other until they are spaced a distance smaller than the outer diameter of shank 1', 1". At the same time, those parts of end portions 74 which extend out of the shank are retracted into opening 8 so as not to project from the shank. As a result, the shank can now be introduced into the through-hole at one side thereof. On the other side of the through-hole, locking member 7 can again assume the condition shown in FIG. 12 once the inner surface of the through-hole releases the end portions 74 of locking member 7, so that they will resiliently spread apart again.

The two shank halves 1', 1" may also be provided with the previously described locking tabs 5 and the corresponding recesses 6.

Figure 13:
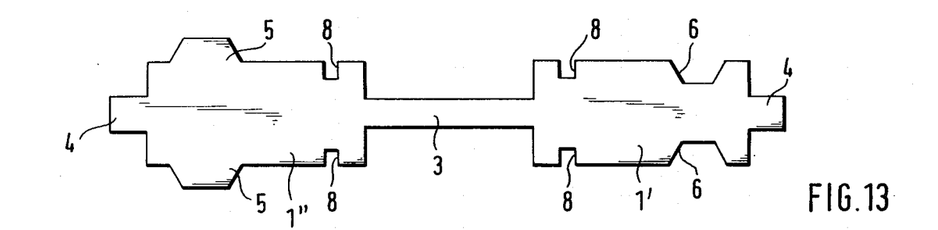

FIG. 13 shows the shape of the blank punched from spring steel in a punching step, from which, apart from locking member 7, all the parts of the lock bolt are formed in a subsequent bending operation.

Figure 17:
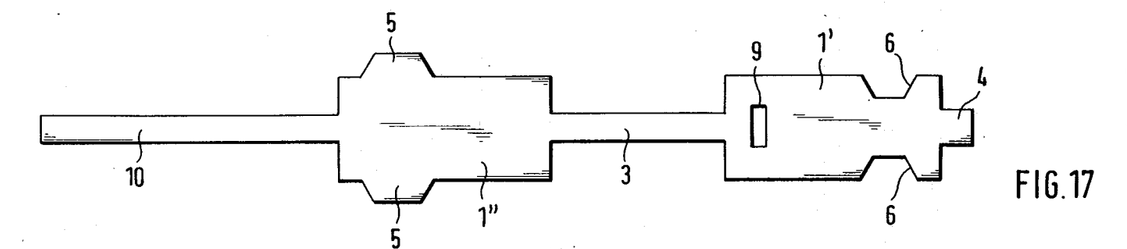

FIGS. 14 to 17 show another embodiment of the inventive self-securing lock bolt, of which all the parts are made in one piece of spring steel. As has been described in connection with the other embodiments, the embodiment of FIGS. 14 to 17 also has a shank 1', 1" consisting of two shank halves, with both these halves being interconnected at one side of the shank by means of a bridge 3. At the other side of the shank, one shank half has an abutment element 4. The other shank half 1"

is provided with a narrow strip-shaped extension 10; attention is directed in this respect to FIG. 17, which shows the punched blank ready for conversion to a lock bolt by a bending operation. Extension 10 is deformed in the bending operation so that—see FIG. 14—an approximately semi-circular portion 101 extends from shank half 1", with portion 101 being curved towards the longitudinal axis of the shank. Portion 101 is followed by a diagonally extending portion 102 extending from the end of the approximately semicircular portion 101 and diagonally through the space enclosed by shank 1', 1" to the one side thereof. An end portion 103 extending in a substantially radial direction projects from diagonal portion 102 through an opening 9 provided in shank half 1' adjacent one end of the shank.

Figure 14:
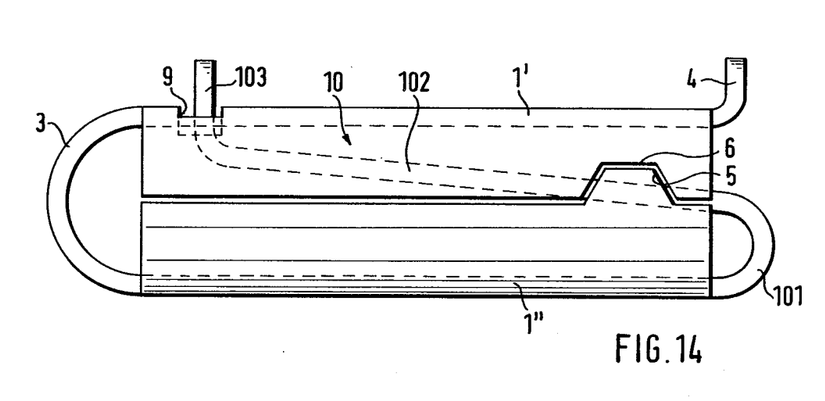
FIGS. 14 to 21 show further embodiments of the invention.
Figure 15:
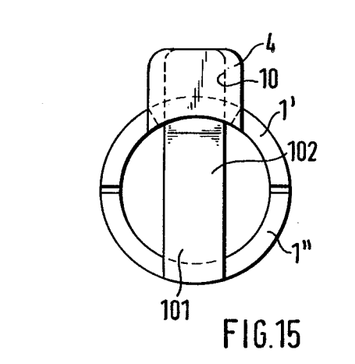
Figure 16:
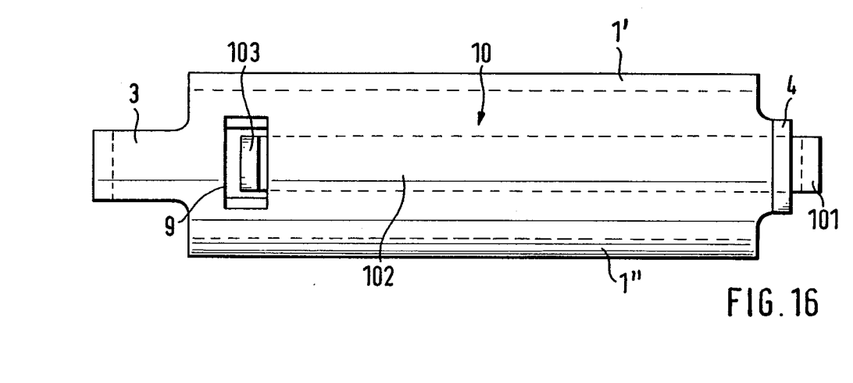

For placing this embodiment of the inventive lock bolt into a through-hole in a structural component, the lock bolt initially is introduced in the through-hole until end portion 103 engages the component. Thereafter, end portion 103 is deflected radially into the opening 9 until the entire shank of the lock bolt can be pushed into the through-hole. On the other side of the component, end portion 103 will resiliently emerge from opening 9. A radially extending end portion of this kind is suited particularly for accepting pulling forces of a particularly high magnitude.

Furthermore, it is possible to set lock bolts of this kind by means of a setting tool which engages the interior of the shank and deflecting portion 102 so that end portion 103 does not project over the shank. After the lock bolt has been placed in position, the setting tool is withdrawn, releasing end portion 103 to effect the lock.

Figure 18:
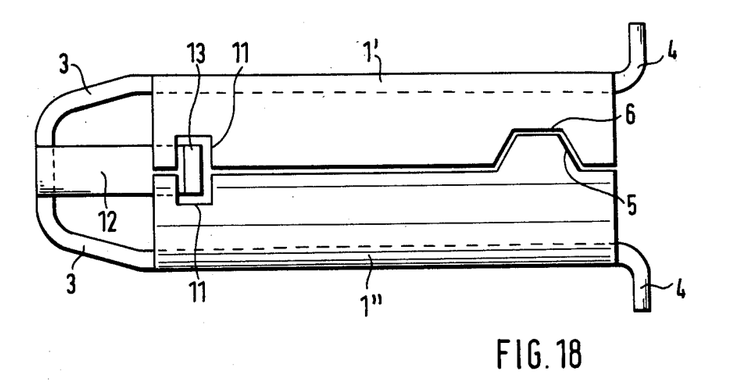

FIG. 18 shows another embodiment of the inventive lock bolt which is similar to the embodiment shown in FIG. 1. Contrary to FIG. 1, locking member 12 of the lock bolt in FIG. 18 is configured so that its portion extending towards shank 1', 1" projects into the space enclosed by the shank and that an end portion 13 integrally formed at the end of the aforesaid portion and extending in a substantially radial direction of shank 1', 1" will project through an opening 11 and beyond the outer periphery of the shank. Opening 11 is defined by two recesses provided each on a side of the shank along contiguous edges of shank sections 1', 1".

After the lock bolt has been introduced into the through-hole(s), end portion 13 emerges from opening 11 and projects radially from the periphery of shank 1', 1". Locking member 12 may have outwardly inclined side surfaces formed outside shank 1', 1", as does locking member 7 of FIG. 12. When the lock bolt is introduced in a through-hole, such side surfaces engage the inner surfaces of the through-hole, causing end portion 13 to be moved inwardly until it does not project over the outer circumference of the shank 1', 1".

Figure 19:
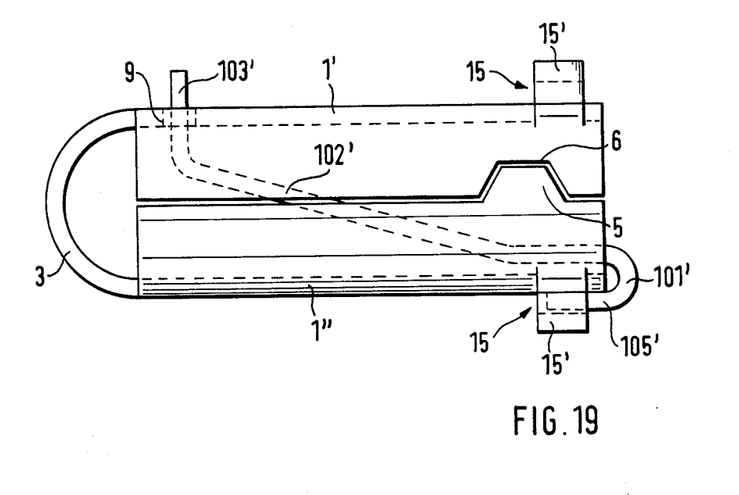
Figure 20:
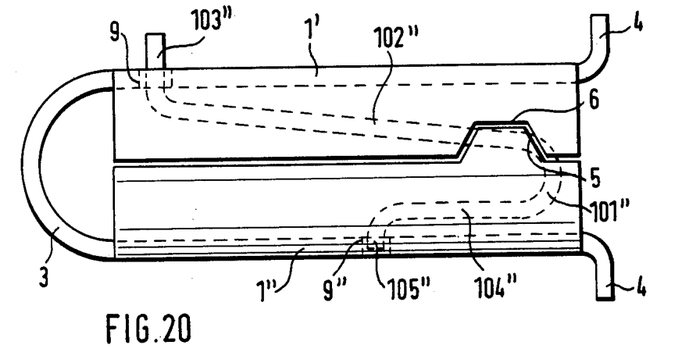

FIGS. 19 and 20 show embodiments of the inventive lock bolt which are similar to the embodiment shown in FIG. 14. The lock bolt of FIG. 19 has on the other side of shank 1', 1" at least one abutment member generated by using a punching step to strike a retaining tab 15 from the material of one of shank halves 1', 1" so that it projects at least partly in a radial direction of the shank and outwardly beyond the shank periphery. For securing locking member 101', 102', 103', 105' in place, end portion 15' of the retaining tab 15 is bent in a punching step so as to clamp a portion 105' thereof firmly in place between the outer surface of the corresponding shank half and the surface of end portion 15' which is disposed towards the shank. Retaining portion 105' is joined to a portion 101' curved towards the longitudinal axis of shank 1', 1" and merging with a portion 102' diagonally extending towards the other side of the shank through the space enclosed by shank 1', 1", said portion 102' in turn merging at its other end with a substantially radially extending end portion 103'. End portion 103' projects through an opening 9 provided in shank half 1' adjacent one end thereof.

In the embodiment shown in FIG. 20, locking member 101" to 105" is designed to have a first end portion 105" thereof engaging an opening 9" provided in shank half 1", which shank half is disposed opposite shank half 1' having an opening 9 at the one side thereof. First end portion 105" merges with a portion 104" extending towards the other side of shank 1', 1". Portion 104" in turn merges with a portion 101" curved towards the longitudinal axis of the shank, which portion merges with a portion 102" extending diagonally through the space enclosed by shank 1', 1" to the one side of the shank section 1'. Portion 102", finally, merges with an end portion 103", which extends radially through opening 9 to the outside of the shank.

Figure 21:
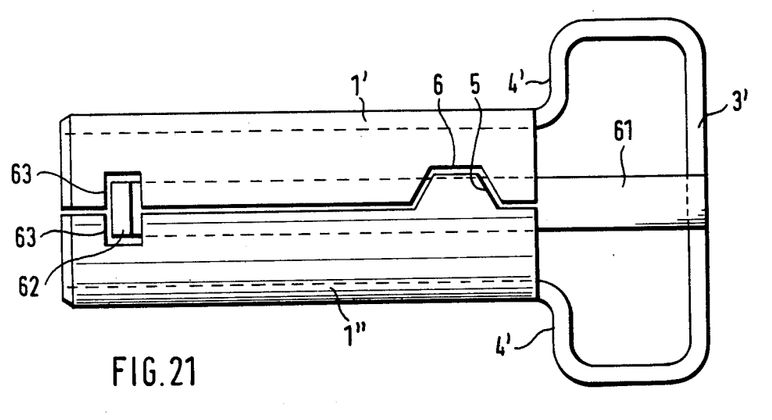

FIG. 21 shows an additional embodiment of the inventive lock bolt in which the locking member preferably is formed integral with bridge member 3' interconnecting the two shank halves 1', 1", with bridge 3' having portions 4' extending substantially radially beyond the periphery of the shank to form abutments. Preferably, the ends of portions 4' which are turned away from shank 1', 1" merge with a substantially U-shaped bridge portion; the locking member is formed integral with said bridge portion in a central area where the U-shaped bridge portion intersects the longitudinal axis of the shank. The locking member comprises an elongated strip-shaped portion 61 which extends from bridge 3' into the space enclosed by the shank. At the end opposite bridge 3' portion 61 joins a radially extending end portion 62 projecting through an opening 63 provided in the shank. End portion 62 normally projects beyond the outer periphery of shank 1', 1". Preferably, opening 63 is defined by two recesses along contiguous edges of shank sections 1', 1". The lock bolt of FIG. 21 can be fabricated advantageously from a single leaf-shaped piece of material by a punching and a bending operation.

In the afore-mentioned embodiments shown in FIGS. 1, 6, 10, 14, 18 and 20, abutments 4 there described may be replaced by radial projections provided by embossing or punching.

The embodiment of FIG. 18 may be made of a starting material shaped as shown in FIG. 4, with recesses 11 punched into the corresponding areas of shank sections 1', 1". The embodiment of FIG. 19 is made of a blank having a shape substantially as shown in FIG. 13. That blank does not include openings 8, however; instead, opening 9 is punched into shank half 1'. Neither are there portions 4 for the abutments: securing tabs 15 serving the same purpose as the above abutments are provided in the punching operation from the material for shank halves 1', 1". The embodiment shown in FIG. 20 is made from a blank similar to the shape shown in FIG. 13, with opening 9 or 9" punched in shank half 1'or 1" instead of opening 8. Finally, the embodiment shown in FIG. 21 is made from a blank similar in shape to that shown in FIG. 4, with abutments 4 omitted and locking member 61, 62 made as a single element perpendicular to bridge 3.

In the embodiment shown in FIG. 8, locking members 2' may be secured to bridge 3 by means of fastening tabs (not shown) struck from bridge 3 to clamp locking members 2' against the central portion of bridge 3.

In the event that the locking member is made of the same heavy-gauge material as the shank portions and the bridge, the material thickness of the locking member may be reduced by a stamping or squeezing operation until the locking member has the required degree of resilience. After such stamping or squeezing operation, the locking member is trimmed to the required shape.

The shank of the inventive lock bolt may be rectangular or square in cross section.

Also, the inventive lock bolt may be made or injection molded from a plastic material, preferably polyamide.

I claim:

1. A one-piece self-securing lock bolt, comprising a tubular shank having a first end and a second end and including discrete first and second sections each extending from said first to said second end; a bridge integrally connected with said sections at the first end of said shank; an abutment extending substantially radially outwardly from said shank in the region of said second end and being integral with one of said sections; and an elongated resilient locking member having a first end portion integral with said first section in the region of said second end, an intermediate portion within said shank, and a second end portion in the region of said first end, said second section having an opening for the second end portion of said locking member, and said second end portion tending to project substantially radially outwardly beyond said shank due to resiliency of said locking member so that, when the bridge is introduced into and through a hole between opposite sides of a structural component with the bridge leading and the second end portion disposed within the confines of the shank until the abutment is adjacent one side and the second end portion is adjacent the other side of the component, the bolt is automatically locked to the component as soon and as long as the second end portion is permitted to move and remains radially outwardly of the shank and overlies the other side of the component.

2. The lock bolt of claim 1, wherein each of said sections constitutes substantially one-half of a hollow cylinder.

3. The lock bolt of claim 1, wherein said shank is a hollow circular cylinder.

4. The lock bolt of claim 1, wherein said bridge is a substantially plate-like element having an arcuate shape, a first end integral with one of said sections and a second end integral with the other of said sections.

5. The lock bolt of claim 1, wherein said bridge extends substantially diametrically of said shank.

6. The lock bolt of claim 1, wherein the first end portion of said locking member has an arcuate shape.

7. The lock bolt of claim 1, wherein the intermediate portion of said locking member extends substantially diametrically of said shank.

8. The lock bolt of claim 1, wherein said locking member is disposed in a diametral plane of said shank.

* * * * *